June 4, 1963 E. A. ROLLEY 3,092,690

HIGH SPEED DATA TRANSMISSION SYSTEM

Filed July 10, 1961 7 Sheets-Sheet 1

INVENTOR.
Emunds A. Rolley
BY C. L. Bulbrandsen
Atty.

June 4, 1963 E. A. ROLLEY 3,092,690

HIGH SPEED DATA TRANSMISSION SYSTEM

Filed July 10, 1961 7 Sheets-Sheet 2

INVENTOR.
Emunds A. Rolley

BY C. A. Gulbrandsen

Atty.

June 4, 1963 E. A. ROLLEY 3,092,690

HIGH SPEED DATA TRANSMISSION SYSTEM

Filed July 10, 1961 7 Sheets-Sheet 3

INVENTOR.
Emunds A. Rolley
BY C. A. Gulbrandsen
Atty.

HIGH SPEED DATA TRANSMISSION SYSTEM

Filed July 10, 1961 7 Sheets-Sheet 4

INVENTOR.
Emunds A. Rolley
BY
C. A. Bullbrandsen
Atty.

HIGH SPEED DATA TRANSMISSION SYSTEM

Filed July 10, 1961 7 Sheets-Sheet 5

INVENTOR.
Emunds A. Rolley
BY
C. A. Gulbrandsen
Atty.

June 4, 1963 E. A. ROLLEY 3,092,690

HIGH SPEED DATA TRANSMISSION SYSTEM

Filed July 10, 1961 7 Sheets-Sheet 6

INVENTOR.
Emunds A. Rolley

BY C. A. Gullbrandsen
Atty.

INVENTOR.
Emunds A. Rolley
BY C. A. Gulbrandsen
Atty.

United States Patent Office 3,092,690

Patented June 4, 1963

3,092,690

HIGH SPEED DATA TRANSMISSION SYSTEM

Emunds A. Rolley, Glenview, Ill., assignor to Automatic Electric Laboratories, Inc., Northlake, Ill., a corporation of Delaware Filed July 10, 1961, Ser. No. 120,900

8 Claims. (Cl. 179—2)

This invention pertains to the transmission of data from one point to another and particularly to a data transmission system whereby information in the form of binary signals may be transmitted over telephone lines, and the transmitting station may select the receiving station in the same manner as used in the placing of an ordinary telephone call. Specifically the invention relates to a data transmission system which may transmit information at the very high rate of 32,500 bits per second; and provides the necessary equipment to compensate for attenuation and distortion of high frequency signals when transmitted over standard telephone cables.

Accordingly, the object of the present invention is to provide a data transmission communication system with capabilities of handling high speed data as well as means for selectively connecting stations of the system to each other for purposes of voice communication and data transmission.

A first feature of this invention is the inclusion of facilities for handling of both voice and data signals and the determination of which form of signalling is being used.

A second feature is the inclusion of facilities for regenerating information transmitted in the data mode.

Still another feature is the inclusion of facilities for handling data transmission in two different forms and additional facilities for determining which form of operation is to be utilized.

Yet another feature is the inclusion of facilities for reproducing voice signals at a relatively constant level for retransmission purposes.

These and other objects of the invention will be more clearly understood from the following specification which describes the preferred but not limiting embodiment of the invention. This specification taken together with the appended claims and the accompanying figures show details of this embodiment according to the principles of the invention.

FIGURE 1 is a block diagram of a data transmission system in accordance with the invention.

FIGURES 2, 3 and 4 comprise a schematic diagram of the switching equipment portion of the system.

FIGURES 5 and 6 form a block diagram of the electronic portion of the system utilized for regeneration and repetition as well as detection of voice and data signals in the system.

Figure 1:
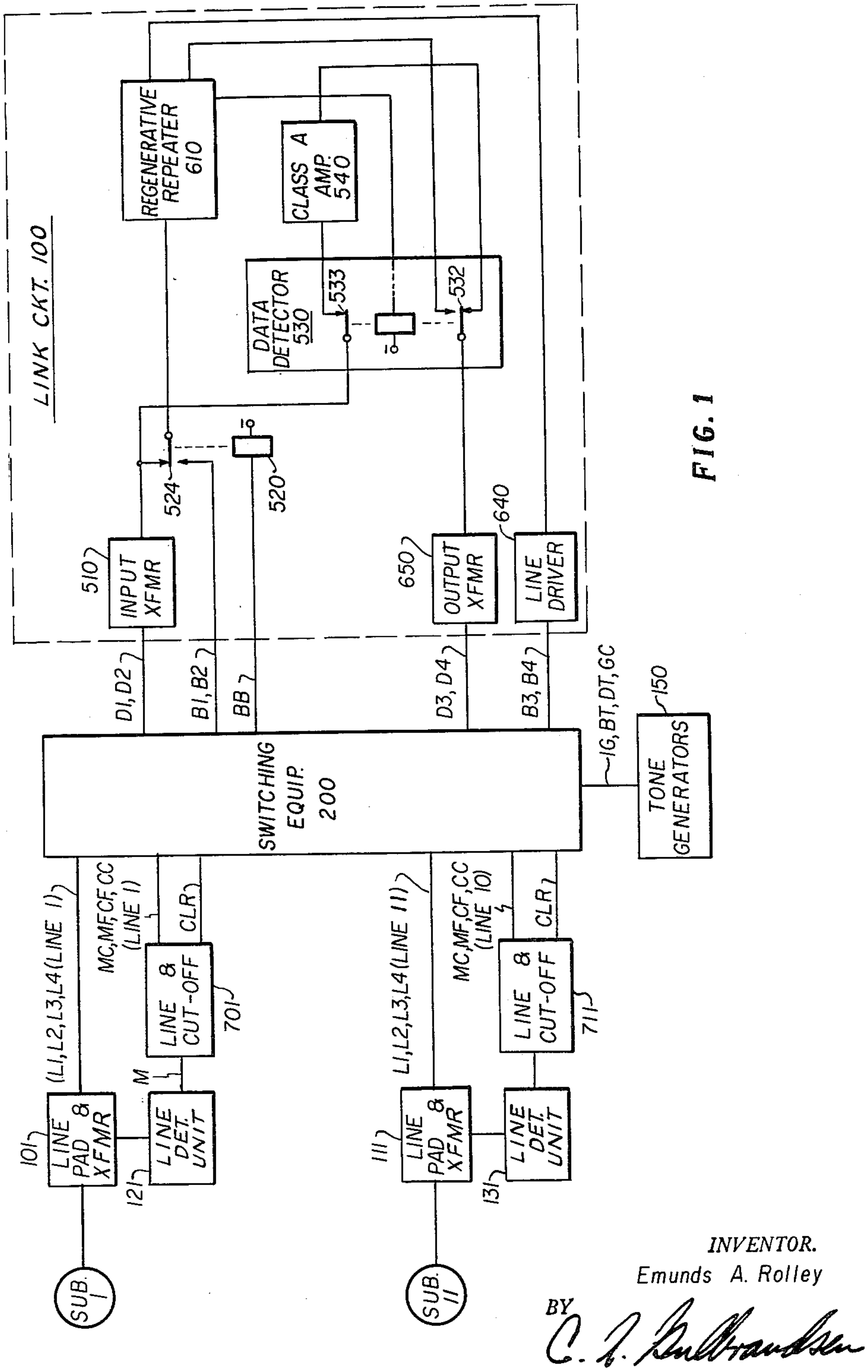
Figure 2:
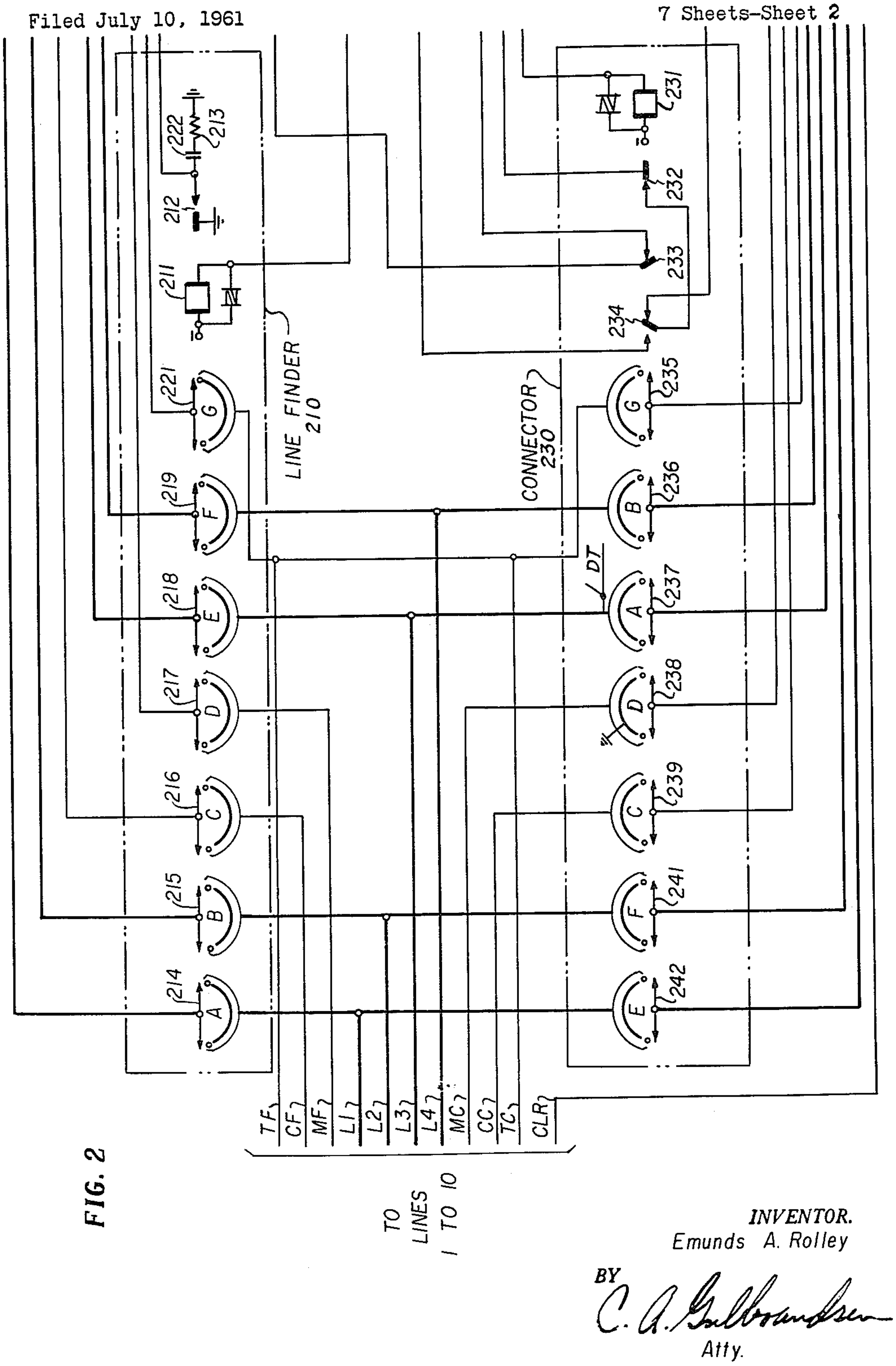
Figure 3:
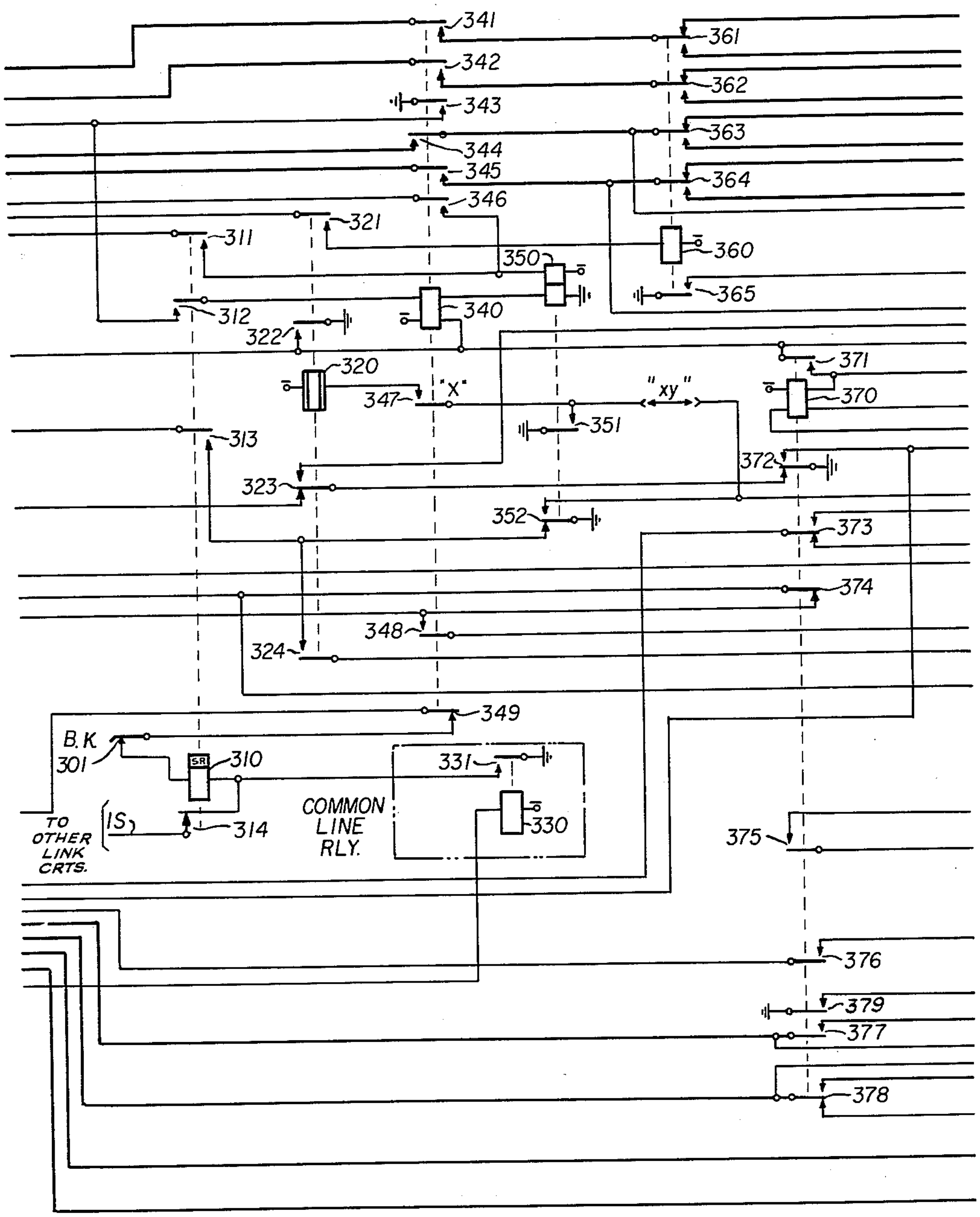
Figure 4:
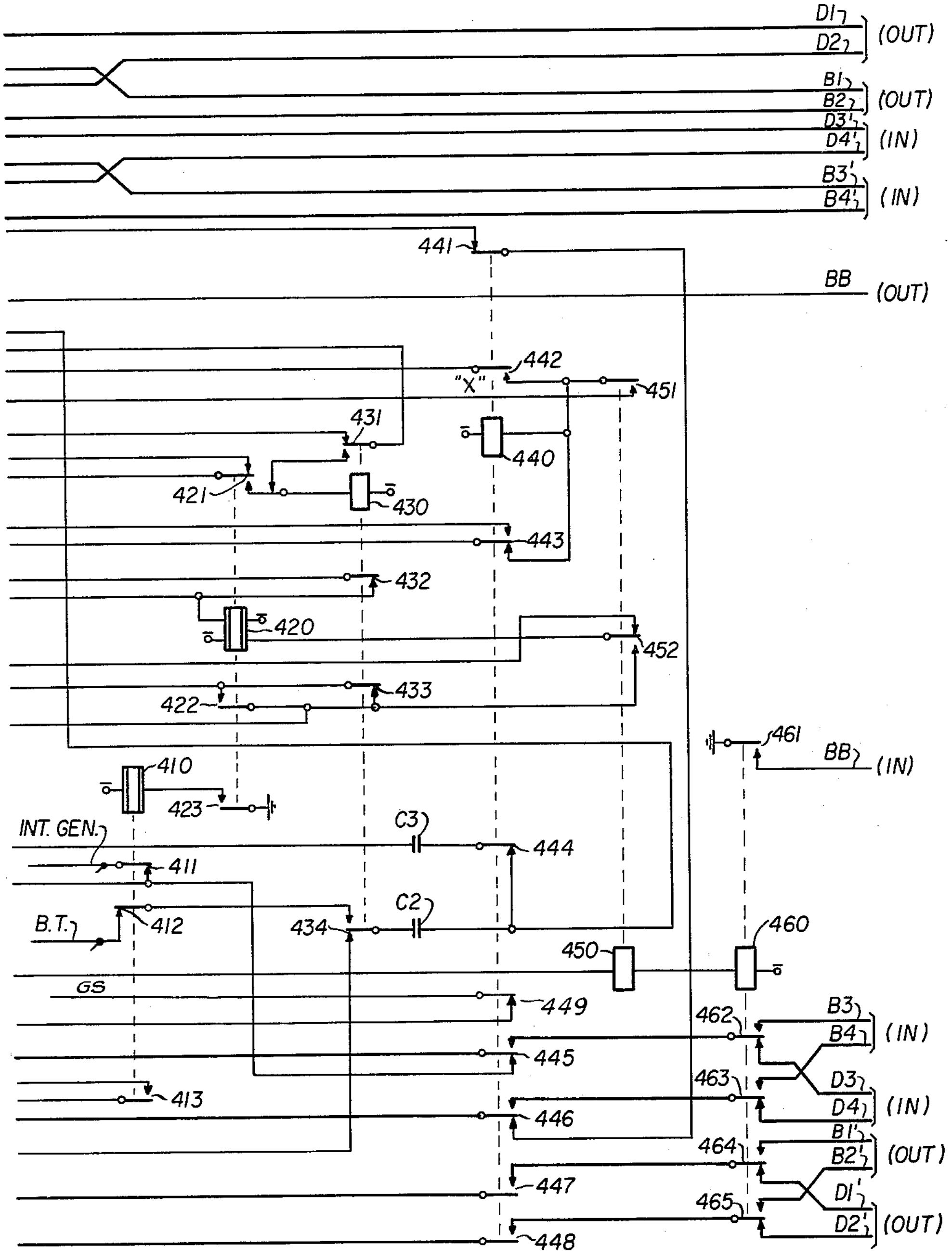

In the embodiment disclosed data transmission is carried on at a very high rate, 32,500 bits per second. It is for this mode of operation that the electronic equipment is required. In a practical embodiment of this system the limit of transmission of such a signal is approximately 20 miles over number 19 gauge unloaded cable. After transmission over such a link the data signal must be regenerated thus the majority of electronic equipment consists of electronic regenerative repeaters. These repeaters take the highly attenuated and distorted data signal which is carried in the form of a phase modulated 32.5 kc. tone, break it down into the direct current stream of marks and spaces (known as base band) and use these marks and spaces to modulate a locally generated 32.5 kc. tone to form a new signal for transmission. In the embodiment shown here there are two talking links and since each link is bidirectional four regenerative repeaters would be necessary.

The theory of operation can be understood by reference to the following. The terms used are defined first, these include: Data—intelligence being transmitted in binary form, in this equipment the rate of data transmission is 32,500 bits per second. Base band—a random bilevel signal that contains intelligence. Diphase—a diphase signal is a normal sine wave signal which changes phase (+90° or −90°) in accordance with the binary signal applied, one phase represents one state of the binary code while the other phase represents the other binary state. Baud—the unit of data signalling speed derived from the duration of the shorter signalling pulse. A speed of 1 baud is one pulse or one bit per second. Kilobaud—abbreviated kb. kilobaud means 1000 bauds. Therefore the term 32.5 kb. means 32,500 bits per second.

Reference to FIGURE 1 discloses the main components of the system. Shown are subscribers 1 and 11 of the system. The theoretical limit of stations in the instant embodiment is 23 stations. Associated with each station are the line pad and transformers shown as 101 and 111, 2600 cycle tone line detector units 121 and 131 associated with subscribers 1 and 11 respectively as well as the associated line and cut off relay equipment shown as 701 and 711. The electromechanical switching equipment 200 is used for connection of one station to another for communication purposes. Tone generators 150 supply in the switching equipment the necessary dial tone, busy tone and ringing tone. In FIGURE 1 the link circuit 100 for use in one direction only is shown with the remaining link circuits for operation in either direction being similar. These include the input transformer 510, base band operated relay 520, data detector 530, the regenerative repeater 610, class A amplifier 540, output transformer 650 and line driver 640.

Dialing is the same as for a normal telephone as far as the subscriber is concerned i.e. he picks up the handset, listens for dial tone then dials the number desired. The difference lies in the fact that dialing is actually done by pulsing a 2600 cycle tone onto the line. When the handset is in the on hook position the tone is on the line, lifting the handset removes the tone. While dialing the number the breaking of the dial contacts lets the tone return to the line for short periods of time. It is this presence or absence of tone that operates the line detector unit 121. The 2600 cycle tone line detector unit 121 includes two paths for the signal to take. One through a series tuned circuit and one through a parallel tuned circuit. Both circuits are adjusted to resonate at 2600 cycles. This means that a signal at that frequency will pass through the series tuned circuit and be stopped by the parallel tuned circuit. Thus we get what are termed the signal and guard channels.

When 2600 cycle tone is not present at the input the noise that is present is of a random nature so that it passes through both of the tuned circuits and is amplified and rectified in both channels. The rectifiers in the guard channel are polarized so they produce a positive voltage output. Those in the signal channel are connected for negative output, by adjusting the channel gain control the output voltages will cancel each other and the relay driver transistor will go into conduction to activate the switching equipment.

When tone is present the output of the signal channel is greater than the guard channel so the junction of the two rectified voltages goes negative. This negative bias on the output stage causes it to be cut off and presents an open circuit at the switching equipment. Thus turning on and off of the output stage permits the dialing function that is normally done by the dial itself.

Switching equipment—basic operation and function of the electromechanical portion 200 is the reception and extension of PAX and trunk calls.

Referring to FIGS. 1, 2, 3 and 4 the initiation of a call causes the 2600 cycle per second electronic line detector 121 to close an operating path to the line finder 210. The line finder steps, relay interrupted and hunts for the calling line. The calling line is marked by resistance battery on a bank contact to the line finder associated with the calling line, and when the switch encounters this mark the line finder operation is terminated. If the incoming call is from a subscriber station employing the base band mode of data transmission, ground through a level of the line finder will be closed to relay 360; if the incoming call is from a subscriber station employing the diphase mode of data transmission, the circuit will not be closed. Relay 360 in operating closes the incoming transmission and receiver loop to the base band regenerative repeater 610. After normal reception of the proper tones in the proper sequence of dialing and busy tests, this circuit will switch through to the designated subscriber's line.

A ground mark on the appropriate PAX connector bank circuit will indicate the type of signal involved in the trunk circuit encountered. This ground mark will be closed to relays 450 and 460 in series. Resistance ground on the bank contact associated with the called line indicates the diphase trunk call and relay 450 only operates. Relay 450 in operating causes this circuit to switch through and permits the operation of ringing and tone equipment of the circuit. Direct ground on the bank contact indicates a base band trunk circuit and relays 450 and 460 operates in series. The operation of relay 450 has previously been explained; however, in this case, relay 460 also operates and closes a circuit to the base band regenerative repeater circuit.

Detailed operation of the switching equipment may be noted by taking for reference purposes the combination of drawings 1, 2, 3, 4 and 7.

When the calling party, subscriber 1, lifts the handset a four wire connection over leads L1 through L4 between the telephone instrument and the 2600 cycle electronic line detector 121 is established. Leads L1 and L2 are associated with the transmitter of the calling party's telephone while leads L3 and L4 are associated with the receiver. This operation closes ground via lead M through the number 2 winding of relay 720 and 330 in series. Relay 720 operates its X contacts 271 only and closes battery through its number 1 winding via lead CF to the associated bank contact of level C of the line finder 210 to mark the calling party's position. Relay 330 operates and closes ground to relay 310 and the motor magnet 231 of connector 230 in series. (Resistance of relay 310 prevents the operation of the motor magnet of connector 230 at this time.) Relay 310 operates opening the IS lead chain circuit to the corresponding relays in the other link circuits, closes an operating path to the motor magnet 211 of line finder 210 at contacts 313 and closes the upper winding of relay 340 and the lower winding of relay 350 in series to level C of the line finder. A circuit is also prepared over contact 311 of the upper winding of relay 350. The motor magnet of line finder 210 is energized with ground extending over the break contact 352, the aforementioned contact 313 and coil of motor magnet of line finder 210 to battery. When line finder motor magnet 211 is energized ground is extended over the associated line finder interrupter springs 212 and contact 311 to the upper winding of relay 350. The line finder is now ready to search for calling lines.

Relay 350 operates removing ground at contacts 352 from the motor magnet of the line finder 210. The motor magnet restores opening its interrupter spring 212 and in turn opening the operating path and the upper winding of relay 350. The line finder is now prepared to advance its wipers to the next bank contact. Relay 350 operates and opens the operating path to motor magnet of line finder 210. The motor magnet restores, opens its interrupter spring 212 and in turn again opens the operating path to the upper winding of relay 350. The line finder thus advances its wipers to the next bank contact. This relay interrupted stepping of the line finder will continue until battery through the relay 720 associated with the calling party is encountered on the bank contact of level C via lead CF to the line finder. The RC network of resistor 213 and capacitor 222 will govern the speed of this relay interrupted stepping by controlling the release characteristics of relay 350.

Resistance battery on the marked contact of level C of the line finder 210 extended over wipers 216 is extended through the lower winding of relay 720 to mark the calling line and is extended via the upper winding of relay 340 and the lower winding of relay 350 to ground. Relay 350 is held operated and in so doing prevents false operation of the motor magnet of line finder 210. Relay 340 operates on its upper winding, operates at its "X" contacts 347 completing a circuit to relay 320. Relay 320 operates preparing a pulsing circuit to the motor magnet of the connector 230, it also prepares circuits to the upper winding of relay 370 and to finder bank G and also prepares a circuit to the lower winding of relay 420 and the lower winding of relay 340. Relay 340 now operates, closing ground over contacts 343 and wiper 216 to the C level of the line finder to operate relay 720 associated with the calling party's line. Relay 340 also completes a path at contacts 346 and the upper winding of relay 350, wipers 217 of level D of the line finder to lead MF opens the circuit at contacts 349 to relay 310, extends a circuit at contacts 348 to the lower winding of relay 420. Operation of relay 340 also closes the calling party's transmitter and receiver circuits via leads L1 to L4 at contacts 341, 342, 344 and 345 through to the electronic repeater circuits.

Relay 310 restores after its slow to release interval and transfers the IS control lead to the next idle trunk, opens the original operating circuits to relay 350 at contacts 311 and to the motor magnet of the line finder 210 at contacts 313. The relay 720 operates completely and opens relay 330. Relay 330 restores opening the circuits which started the line finding sequence. Relay 420 is operated and closes a path to the motor magnet of the connector 230 at contact 422, prepares a circuit to relay 430 at contacts 421 and extends ground to relay 410 at contacts 423. Relay 410 operates closing a short circuit to wipers 237 and 236 of levels A and B of the connector. These leads are associated with the receiver of telephones other than the desired called party. Relay 410 also opens the leads to interrupter generator at contacts 411 and busy tone at contacts 412. Dial tone is now provided to calling party's receiver via leads L3 and L4.

When the calling party dials a desired number the electronic equipment repeats the dial pulses via lead MF and the upper winding of relay 350. Relay 350 operates and restores in accordance with these pulses.

During each pulse relay 350 restores, closes relay 420 and the motor magnet of line finder 210 in multiple and opens relay 320. After each pulse relay 350 operates, closes relay 320 and opens relay 420 and finder magnet 211. The motor magnet of connector 230 restores after each pulse and in restoring the wipers of the connector are advanced one bank contact. During the first digit relays 320 and 420 remain operated due to their slow to release characteristics. Upon taking its first step the off normal springs 233 in the connector 230 operate and open relay 420. After the last pulse of the first digit, relay 350 reoperates and opens relay 420 and the motor magnet of connector 230 and closes relay 320.

If the digit dialed was 1 through 9 relay 420 will restore after a busy test is made of the called party's line. If the digit dialed was a 0, relay 420 is re-energized on its number 2 winding. The calling party will dial the next digit at this time. The operation as explained above in the section will be repeated until the wipers of the connector have been advanced to the desired position associated with the called party's line.

The following table indicates the numbers that may be assigned to the telephone associated with this system.

| | |
|---|---|
| 1 | 03 |
| 2 | 04 |
| 3 | 05 |
| 4 | 06 |
| 5 | 07 |
| 6 | 08 |
| 7 | 09 |
| 8 | 001 |
| 9 | 002 |
| 01 | 003 |
| 02 | 004 |
| | 005 |

If the called party's line is busy a ground mark will be encountered on the bank contact of level C of the connector 230 associated with the called party's line. During the slow to release interval of relay 420 this ground will be extended to relay 430. Relay 430 operates, opens the pulsing circuit to the connector and the holding circuit to relay 420, opens the reoperating circuit of relay 420, opens the operate circuit of relay 370, prepares to lock and provide busy tone to the calling party. Relay 420 restores and opens relay 410 and closes the locking circuit to relay 430. After its slow to release interval relay 410 restores, removes the short circuit via leads L3 and L4 from the receiver of the called party's telephone and closes lead BT (busy tone) via capacitor C2 to the receiver of the calling party's telephone.

The called party's line is now seized by means of the following sequence: Relay 420 restores after its slow to release interval closing relay 370 to level C of the connector and opens relay 410. Battery through the number 1 winding of the relay 720 associated with the called party via level C of the connector indicates an idle line, and when encountered is closed through the lower winding of relay 370 to ground. Relay 370 operates its "X" contacts, operates completely and locks through contacts 322 of relay 320. Relay 410 restores after its slow to release interval, removes the short circuit from the receiver via leads L3 and L4 of the called party's telephone and prepares a circuit from interrupted generator to the calling and called party's telephones.

Relay 370 in operating closes ground to lead GS (generator start) closes lead IG (interrupted generator) via capacitor C3 to the calling party to provide ringback tone and directly to the called party as ringing current via leads L3 and L4 to each party, closes ground to the number 1 winding of relay 720 associated with the called party via level C of the connector and leads CC to mark the called party busy to other link circuits and operate relay 720, prepares a circuit for the operation of relay 440 when the called party answers. Closes a portion of the called party's transmitter and receiver circuits (via leads L1 through L4) to the electronic repeater circuits (FIGS. 5 and 6), opens the pulsing circuit of the connector motor magnet to prevent further operation of the connector and prepares a circuit to relays 460 and 450 in series. The operation of relays 460 and 450 will be explained later.

When the called party lifts the handset a four wire connection via leads L1 through L4 between the telephone instrument and the 2600 cycle per second electronic line detector 121 is established. Leads L1 and L2 are associated with the transmitter of the called party's telephone while leads L3 and L4 are associated with the receiver. This operation closes ground via lead M to relay 440. Relay 440 operates its "X" contacts, operates completely and locks with the contacts of relay 320. Relay 440 in operating, opens the circuits which provide the ringback tone and ringing current, opens the start circuits for the tone and completes the four wire connection between the calling party's and the called party's telephones. Conversation may now take place.

Upon completion of the conversation the calling party restores the handset at the completion of the call. Ground is removed from lead MF causing relay 350 to restore. Relay 350 in restoring removes ground from leads M and opens relay 320. Relay 320 restores after its slow to release interval, prepares a circuit to the connector motor magnet and opens the holding circuits to relays 340, 440 and 370. Relay 340 restores, removes ground from lead CF to allow the calling party's line equipment (relay 720) to restore. Prepares a circuit to relay 310 for reseizure of this link and opens a portion of the transmission circuit. Relay 440 restores, relay 370 restores, removes ground from lead CC of the called party to allow its line equipment (relay 720) to release and closes ground to the motor magnet of the connector. The connector steps self interrupted to its normal home position where the off normal springs 234 restore and open the homing circuit. The circuit is now at normal.

If strap "XY" is provided this circuit will provide for last party release. Relay 350 will restore when the called party restores the handset, however the remainder of the circuit is held operated via ground on lead M through level D of the connector to relay 320. Release of the circuit in this condition starts with removal of ground from lead M due to the restoration of the handset by the called party. The relay restoration starting with relay 320 is the same as described in the preceding paragraph.

When the calling party restores the handset upon receiving busy tone ground is removed from relay 350 via lead MF. Relay 350 restores and opens the circuit to relay 320. Relay 320 restores after its slow to release interval, opens relay 430 and 360 if operated and closes ground to the connector motor magnet via the connector off normal springs and the connector interrupter springs. Relay 360 restores, relay 320 restores opens relays 720 and 420, opens the transmission circuit and prepares a circuit to relay 310 for reseizure of this link. Relay 430 restores, the connector steps self interrupted to its normal or home position where the off normal springs restore and open the homing circuit. This circuit is now at normal. The following will describe means whereby trunk calls may be extended.

If the incoming call is from a trunk which has been previously designated as a diphase trunk, ground on lead TF associated with the incoming trunk is not wired. Therefore when the line finder encounters the calling trunk upon seizure after searching, relay 360 remains unoperated. The incoming trunk is connected to the diphase portion of the electronic repeater circuits.

If the incoming call is from a trunk which has been previously designated as a base band trunk, lead TF associated with the incoming trunk is wired to ground. Therefore when the line finder encounters the calling trunk upon seizure after searching relay 360 operates. The incoming trunk is connected to the base band portion of the electronic repeater circuits.

The seizure, line finding, dialing and switch through operations of an outgoing trunk call are the same as previously explained, except that it has one exception;

when relay 370 operates, a circuit is closed to relay 460 and 450 in series to ground on level G of connector 230.

If the outgoing call is to a trunk which has been previously designated as a diphase trunk the mark on level G of the connector is of resistance ground. Due to the value of the resistance only relay 450 will operate. The outgoing trunk is connected to the diphase portion of the electronic repeater circuits.

If the outgoing call is to a trunk which has been previously designated as a base band trunk, the mark on level G of the connector is direct ground. Both relays 460 and 450 thus operate. The outgoing trunk is connected then to the base band portion of the electronic repeater circuits.

In either case relay 450 operates preparing a circuit to relay 420 and closes relay 440. Relay 440 operates, closes its "X" contacts and locks to the contacts of relay 320, switches the calling party's transmission circuits to the desired trunk as explained earlier and extends the pulsing circuit from the contacts of relay 350 to the selected electronic trunk circuit, for continuation of the call to the distant office. Relay 420 reoperates each time a digit is dialed to allow for the reoperation of relay 410. Relay 410 operates as noted previously.

Release of this circuit is the same as noted above with the exception that relay 450 and relay 460 (if operated) will restore following the restoration of relay 370.

In the system three tone generators 150 are employed for provision of supervisory tone to the distant subscriber. These tones are dial tone, busy tone and ringing tone. Dial tone is generated by a transistorized tone generator for producing a 600 cycle tone modulated at 120 cycles. This tone is connected to the switching equipment over lead DT. Busy tone is produced by feeding dial tone to a free running multivibrator having a speed of 2 cycles per second. Thus dial tone is interrupted at the rate of 2 times a second and the resultant output is utilized as busy tone is applied to the switching equipment over lead BT. The 1000 cycle ringing tone is generated by a phase shift oscillator and gated by two free running multivibrators, the first of which supplies gating to the telephone line with an on condition for 2 seconds and off for 4 seconds. During the two seconds of on time the second multivibrator opens and closes at the rate of 12 times a second. This fast interruption gives a ringing sensation to the tone. The resulting interrupted output is applied over the interrupted generator or IG line to the switching equipment where it is utilized for ringing of a called party. The return side of all three tones from the switching equipment comes over the GC or common ground line.

Figure 5:
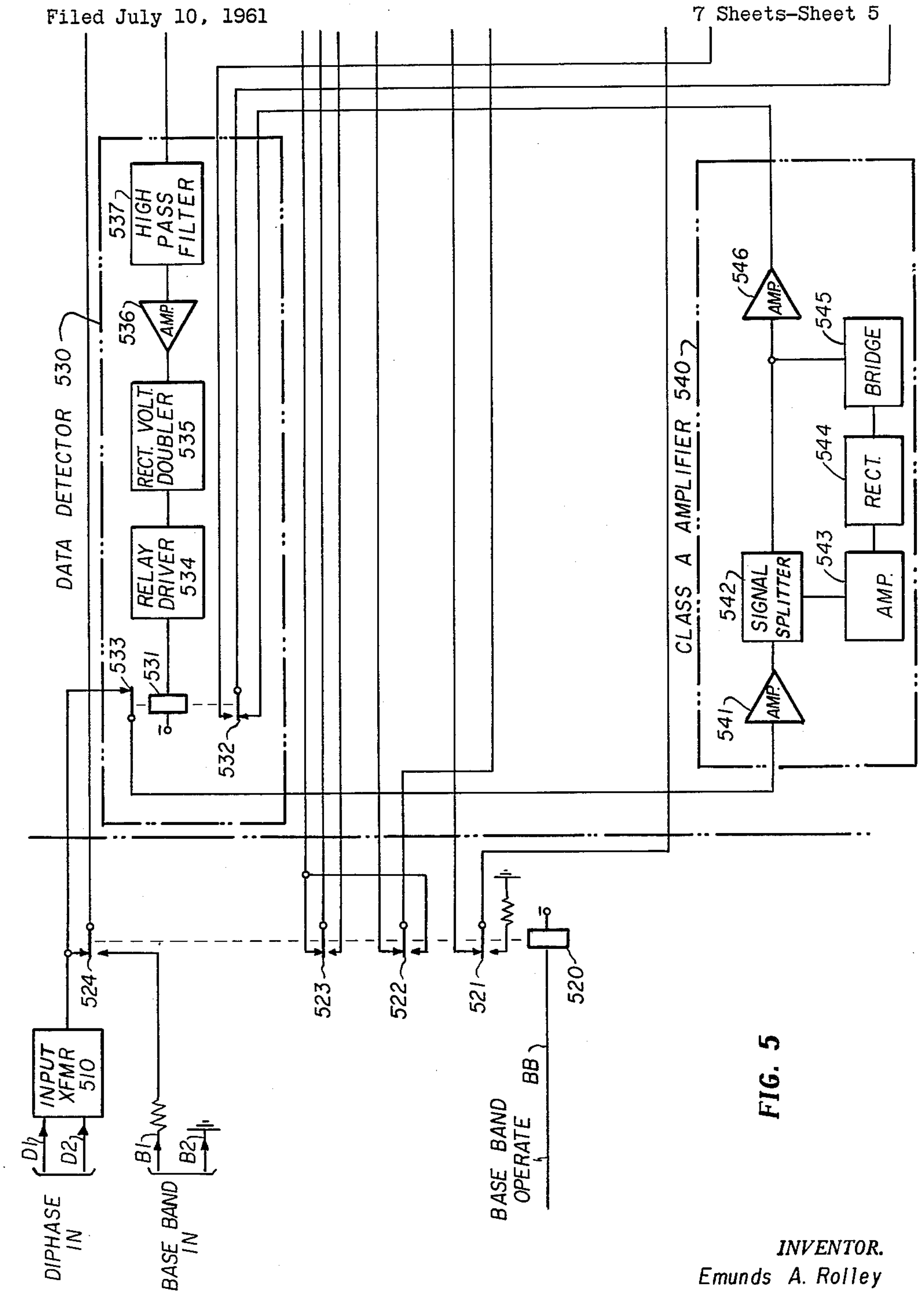
Figure 6:
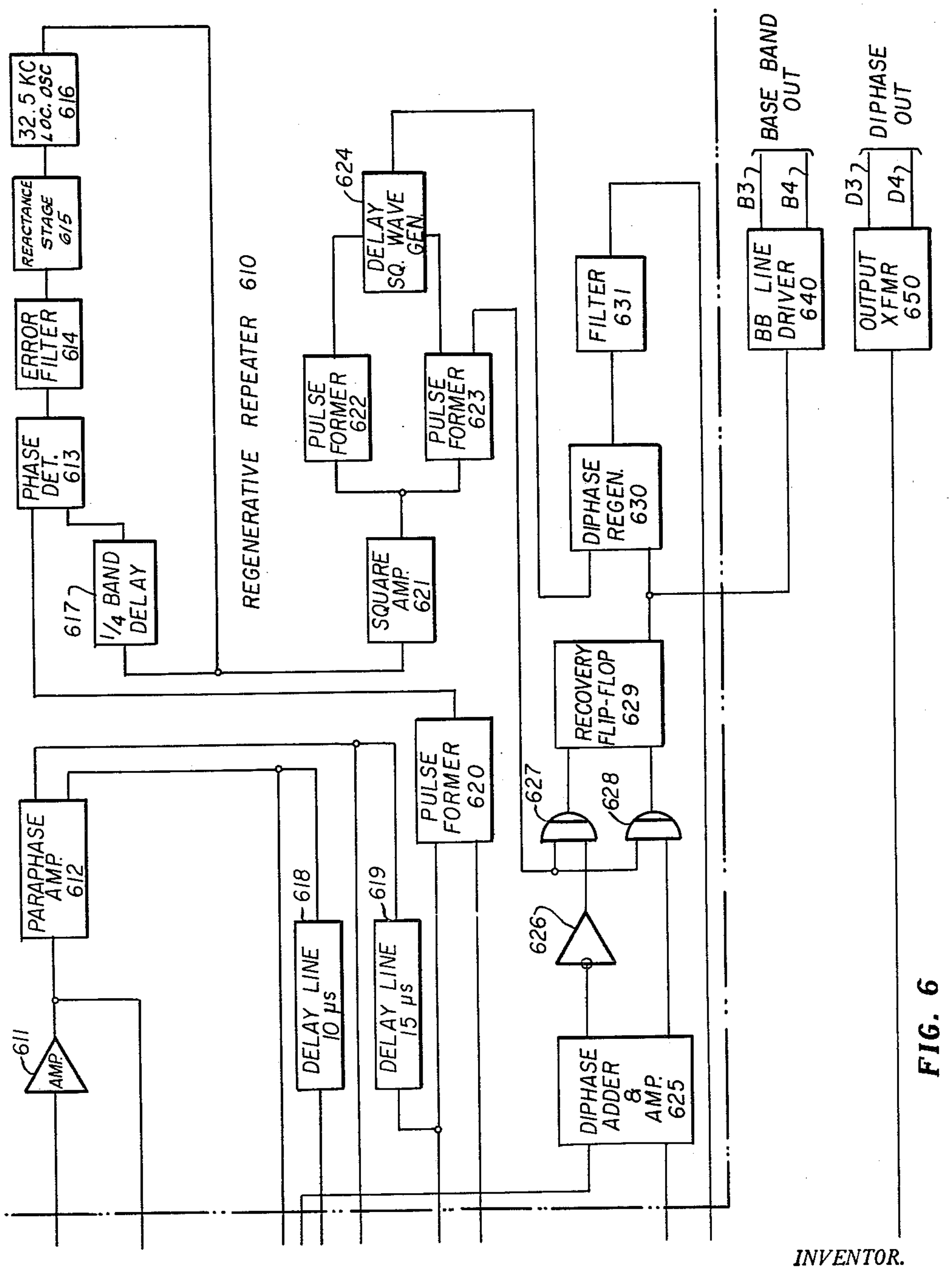

Referring to FIGS. 1, 5 and 6, after all the dialing functions have been completed and the called party has been reached the electronic link equipment comes into operation. The link equipment can operate in either of two modes, voice or data. The mode is determined by the operation of the terminal equipment the user of the terminal equipment changes the operation of his equipment usually by turning of the switch or pushing or pulling a button. As soon as the operation of the terminal equipment changes mode the data detection exchange automatically detects this change and operates on the line circuit appropriately.

Line transformers (101–111) are used to isolate the equipment from the transmission lines, and provide a take off point for the 2600 cycle tone. The transformers are connected for a primary and secondary impedance of 200 ohms in a 1 to 1 turn ratio. This connection best matches the equipment to the line. To correct for some of the phase distortion of the line a line pad is inserted between the incoming lines and the line transformers. The transmitters in the station equipment have adjustable line equalizer control and the receivers have fixed equalization. Half of the line is equalized by the receiver and half by the transmitter. Output of the line transformer goes to the line finder portion of the switching equipment, 200.

Referring to FIG. 5, the data detector 530 consists of a high pass filter 537, an amplifier 536, a rectifier-voltage doubler 535 and a relay driver 534. In operation the high pass filter 537 discriminates between voice signals and high frequency data. Data signals are not attenuated to the filter and are presented to the amplifier. The amplified signal being rectified, applied as a D.C. signal to relay driver circuit 534. This driver stage is biased to a point where it is in a cut off state when no signal is applied. The presentation of a D.C. signal at the driver stage causes the stage to go into conduction and energize the data relay 531. Voice frequency signals at the input are rejected by the filter and therefore cannot perform a function. In the unoperated condition the data relay 531 connects the input and output circuits to the class A amplifier 540 and in the operated position the input signal is removed from the class A amplifier and the output is transferred from the class A amplifier to the regenerative repeater 610.

Essentially the data detector is a relay driver circuit having a frequency selective input. A high frequency signal (32.5 kc.) applied to the input causes a shift in bias in a transistor having a relay as its load. Shift in bias causes the transistor to conduct and operate the relay. Voice frequencies or no signal applied to the input leaves the relay unoperated. This relay is used to transfer the circuit from voice to data operation and vice versa depending upon the nature of the input signals.

Figure 8:
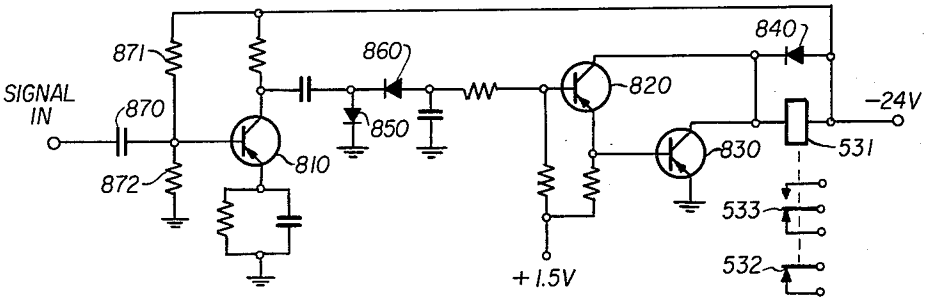
FIGURE 8 is a schematic circuit diagram of the data detector utilized in the instant system.
Figure 7:
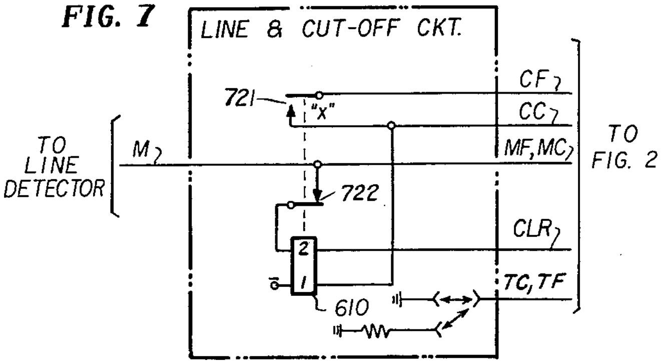
FIGURE 7 is a schematic diagram of the individual line equipment associated with each station in the system.
Figure 9:
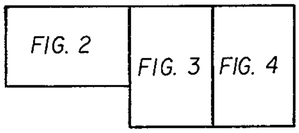
FIGURE 9 shows the manner for assembling FIGURES 2, 3 and 4 for the proper understanding.
Figure 10:
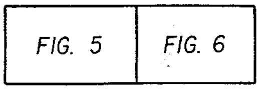
FIGURE 10 is the manner for placement of FIGURES 5 and 6 for the proper understanding.

Specifically the data detector, referring now to FIG. 8, includes transistors 810, 820 and 830. Relay 531 is included as the collector load of transistor 830. The bias of transistor 830 is such that it does not conduct when no signal is present at the input of the data detector. Therefore relay 531 remains unoperated. Voice frequency signals are attenuated by the input filter network consisting of capacitor 870 and resistors 871 and 872. They have little or no effect on the bias of driver transistors 810 and 820. However a high frequency signal passes through the filter, applied to the base of transistor 810, amplified, rectified by diodes 850 and 860 and applied to the base of transistor 820. The diodes of the rectifier are polarized so that an applied A.C. signal will cause a negative D.C. output with respect to ground. The negative voltage applied to the base of transistor 820 causes a negative shift in the bias of transistor 820. This negative bias causes 820 to conduct shifting the voltage of its emitter and therefore the base of transistor 830 in the negative direction. When transistor 830 is switched into conduction data relay 531 operates. Operation of relay 531 removes the line signal from the input of the class A amplifier at relay contact 533 and transfers the input of the line driver from the output of the class A amplifier to the output of the regenerative repeater, 610.

The class A amplifier 540 disclosed in the system (FIG. 5) is more elaborate than ordinary class A amplifiers. This particular amplifier has specific properties not normally used for voice reproduction. Specifically it must provide a relatively constant level of output with a wide variation of input levels with little distortion.

The class A amplifier is electrically in parallel with the regenerative repeater 610 and is used when the intelligence being transmitted is voice rather than data. It is designed to operate with an input range of −30 dbm to −6 dbm. Over this range the average output level should vary only + or −2 db from −6 dbm.

The automatic gain control of the circuit is derived by using a balanced bridge 545 connecting the bridge from the output of one of the amplifying stages 541 to ground. Impedance of this bridge is varied by the amplitude of the incoming signal. For a large amplitude signal the impedance to ground is lowered and the signal is amplified less.

Automatic gain control action is delayed by considerable time intervals so that the gain of the circuit is not increased immediately when voice disappears. Thus room noise during the silent period will cut down ringing and the time between bursts of noises will be too short to permit the gain of the circuit to build up.

The input stage or preamplifier 541 is biased to give class A operation. The amplified signal is then passed to a signal splitter 542 or paraphase amplifier. One portion of the signal is passed onto the rest of the amplifier circuit 546. The other portion of the signal is amplified and then rectified by a rectifier 544 and fed into bridge 545. The bridge is made up of resistors, capacitors and diodes. The presence of the diodes allows the bridge impedance to ground to be controlled by a D.C. voltage. Thus D.C. voltage is obtained directly from the output of the bridge. The bridge impedance varies inversely with the input signal amplitude.

As the amplitude of the input signal increases the shunt impedance of the bridge 545 to ground is reduced. The signal still remaining is then amplified by the output amplifier 546 to the desired level. As the signal level decreases the shunt impedance increases keeping the output relatively constant.

The regenerative repeater 610 accepts low level noise signal in either diphase or base band form. The incoming signal in pulse form is compared to the wave form of a local oscillator 616 and an error signal is generated to change the oscillator frequency to exactly that of the incoming signal. This oscillated output is delayed and squared and gated by the base band which has been extracted from the incoming signal. In diphase output operation this gated square wave is applied to the output transformer 650 through a gaussian filter 631 to remove the upper harmonics and form a relatively pure sinusoidal output. In base band operation the extracted base band is fed directly to an output line driver 640.

The regenerative repeater is one of the most complex portions of the systems. Normal repeaters amplify the incoming signal then retransmit it. This method of operation of course does not eliminate the noise that is on the incoming signal. It is a portion of the output signal. The regenerative repeater however gets rid of the incoming noise by completely recreating the incoming singal. This is done by detecting the base band from the signal then using it to modulate the transmitter. To increase accuracy in the transmitted signal the local oscillator is synchronized with the incoming wave. Upon entering the equipment the signal is passed through an attenuation path which makes all incoming lines appear to be electrically of the same length. This eliminates the necessity for making internal adjustments when switching between lines at different lengths. At the frequency used the input from the lines can vary from +70 dbm (5 volts p–p) at 0 mile to 36 dbm (15.8 millivolts p–p) at 15 miles. The main problem involved in operating over this wide range of links is not so much the attenuation of the signal but the distortion of the signal due to frequency characteristics of the line. If the line had a flat response over the spectrum involved the system would accept a lower level input.

Referring to FIGS. 5 and 6 for a detailed description, the incoming signal is extended from the switching equipment to the input transformer 510. This transformer isolates the repeater from the switching equipment increasing the impedance from 135 ohms to 1,000 ohms to match the input impedance of the receive amplifier 611. The signal then goes to the amplifier stage which does the equalization for the receiver portion of the repeater and changes the signal at this point from a low level sine wave to a high level square wave.

The next stage is a paraphase amplifier 612 or phase splitter. From this stage we get two outputs. One called normal di-phase and the other called inverted di-phase. The inverted di-phase signal is delayed a half cycle or fifteen microseconds by a lumped constant delay line 619. This inverted and delayed di-phase signal is mixed with the inverted signal without the delay in the stage noted as the pulse former 620. The signal thus formed is a series of positive and negative pulses. These pulses are fed into the phase detector stage 613. In the phase detector the synchronized pulses are compared with the signal from the local oscillator 616. Any difference between the synchronizing pulse and the local oscillator is amplified in the error filter 614 and used to shift the frequency of the local oscillator by its effect on the reactance stage 615. The output of the oscillator is then fed into a squaring amplifier 621 where it becomes a relatively square wave. The signal is then differentiated so that a pulse is derived from each slope. These pulses are formed by pulse formers 622 and 623. The pulse corresponding to the positive going slope which is called the zero pulse and the pulse conforming to the negative going slope the zero plus 180° pulse. These pulses are then applied to the opposite sides of the flip flop called the delayed square wave generator 624 which generates the delayed 32.5 kc. square wave. This delayed square wave is then fed into the di-phase regenerator 630.

Now let us return to the output of the paraphase amplifier. The normal signal is mixed with the inverted and delayed signal in the adder 625. The output of this adder is a two level wave and the inversion of the two level wave is used to control two gates which are used to trigger a recovery flip flop 629. The output of this circuit is the base band counterpart of the incoming di-phase signal.

The base band signal just mentioned is mixed with the delayed square wave in the di-phase regenerator 630 and the result is a phase modulated square wave at the exact same frequency as the incoming signal. Of course a square wave cannot pass through the line transformers so the di-phase square wave is sent through a gaussian filter 631, with a cut off of 65 kc. Since the filter removes all the harmonics above 65 kc. the output of the filter is a relatively pure sine wave. This di-phase signal is sent through onto the output transformer 650.

What is claimed is:

1. A communication system comprising: a plurality of subscriber stations each adapted to transmit and receive voice signals, and to transmit and receive binary data signals; switching means connected to one of said subscriber stations operated in response to one of said subscriber stations to extend circuit connections to a second one of said subscribers' stations; data regenerating means; voice signal repeating means including first amplification means, second amplification means, signal rectification means, and level determining means operated in response to rectified signals received from said first amplifier to control said second amplifier to increase or decrease magnitude of signals tansmitted from said amplifier; data detection means connected to said switching equipment operated in response to receipt of binary data signals to send said signals from said switching equipment to said data regenerating means, and operated in response to receipt of voice signals to send said voice signals to said voice signal repeating means; said data regenerating means operated in response to receipt of binary data signals to regenerate like signals and transmit said regenerated signals to said switching equpment; said voice signal repeating means operated in response to receipt of voice signals from said switching means to repeat said voice signals and transmit said voice signals through said switching means to one of said subscriber stations.

2. In a communcation system as claimed in claim 1 wherein said voice frequency repeating means include: first amplification means; second amplification means; signal rectification means; and level determining means operated in response to rectified signals received from said first amplifier to control said second amplifier to increase or decrease the magnitude of signals transmitted from said amplifier.

3. In a communication system as claimed in claim 1 wherein: said data detection means comprise signal filter means operated to pass binary data signals and reject voice frequency signals, rectification means coupled to said filter means for converting said binary data signals to direct current signals, switching means connected to said rectification means opeated in response to receipt of direct current to connect said data regenerating means to said switching equipment and disconnect said voice frequency repeating means from said switching equipment.

4. A communication system comprising: a plurality of subscriber stations each adapted to transmit and receive voice signals and to transmit and receive binary data signals; switching means connected to said plurality of subscriber stations operated in response to one of said subscriber stations to extend circuit connections to a second one of said subscriber stations; data regenerating means; voice signal repeating means; data detection means comprising signal filter means operated to pass binary data signals and reject voice frequency signals, rectification means coupled to said filter means for converting said binary data signals to direct current signals, relay means connected to said rectification means operated in response to receipt of direct current to connect said data regenerating means to said switching means and disconnect said voice signal repeating means from said switching means, operated in response to receipt of voice signals to send said voice signals to said voice signal repeating means; said data regenerating means operated in response to receipt of binary data signals to regenerate like signals and transmit said regenerated signals to said switching means; said voice signal repeating means operated in response to receipt of voice signals from said switching means to repeat said voice signals and transmit said voice signals through said switching means to one of said subscriber stations.

5. In a communication system: a plurality of subscriber stations each adapted to transmit and receive voice frequency signals and to transmit and receive binary data signals; switching equipment connected to said subscriber stations and including means operated in response to one of said subscriber stations to extend circuit connections to a second one of said subscriber stations; signal regenerating means operated in response to receipt of binary data signals received from said switching means to regenerate like signals and transmit said regenerated signals, including local signal generating means, signal comparison means and signal transmission means; voice frequency means operated in response to voice signals received from said switching means to repeat said voice signals and transmit said repeated voice signals through said switching means to one of said subscriber stations including first amplification means, second amplification means, signal rectification means and level determining means connected to said signal rectifying means operated in response to receipt of rectified signals from said first amplifier to control said amplifier to increase or decrease the magnitude of signals transmitted to said subscriber station; and data detection means comprising signal filter means operated to pass binary data signals and reject voice frequency signals, rectification means coupled to said filter means for converting said binary data signals to direct current, and switching means connected to said rectification means operated in response to receipt of direct current signals to connect said data regenerating means to said switching equipment and disconnect said voice frequency signal repeating means.

6. In a communication system: a plurality of subscriber substations each adapted to transmit and receive voice signals and each adapted to transmit and receive binary data signals, data detection means coupled to each of said stations operated in response to a preselected one of said stations to detect the presence of said station; switching equipment; line equipment including means operated in response to detection of one of said subscriber stations by said line detecting means for seizing said switching equipment and in response to termination of a call by one of said substations to disconnect said line equipment from said switching equipment; said switching equipment including means operated in response to seizure by said line equipment to search for said one of said subscriber stations and extend circuit connections to said substation and in response to said substation; signal regenerating means; voice frequency repeating means; data detection means connected to said switching equipment operated in response to receipt of binary data signals to send said signals from said switching equipment to said data regenerating means, and operated in response to receipt of voice signals to send said voice signals to said voice signal repeating means, said signal regenerating means including local generating means, signal comparison means, and signal transmission means, operated in response to receipt of binary data signals to regenerate like signals and transmit said regenerated signals; said voice frequency generating means including first amplification means and second amplification means, signal rectification means and level determining means, the first amplification means operated in response to voice signals received from said switching means, said level determining means operated in response to rectified signals received from said first amplifier to control said second amplifier to increase or decrease the magnitude of signals transmitted from said second amplifier through said switching means to one of said subscriber stations; said data detection means further comprising signal filter means operated to pass binary data signals and reject voice frequency signals, rectification means coupled to said filter means for converting said binary data signals to direct current, switching means connected to said rectification means operated in response to receipt of direct current to connect said data regenerating means to said switching equipment and disconnects said voice frequency repeating means from said switching equipment.

7. In a communication system as claimed in claim 6 wherein said data detection means further include: a plurality of transistors coupled one to another in cascade fashion and including a high pass filter connecting said switching means to the input of one of said transistors, and relay means connected to the output of another one of said transistors, said relay means operated in response to the receipt of binary data signals at said input to connect said signal regenerating means to said switching equipment.

8. In a communication system: a plurality of subscriber stations each adapted to transmit and receive voice signals and to transmit and receive binary data signals; at least one of said stations adapted to transmit data in a first binary mode including means for marking said station in accordance with said first mode of operation, at least one of said stations adapted to transmit data in a second binary mode including means for marking said stations in accordance with said second mode of operation; detection means coupled to each of said subscriber stations and operated in response to the operation of one of said stations; switching equipment; line equipment including means operated in response to said line detection means for seizing said switching equipment and including means in response to termination of a call by one of said substations to disconnect said line equipment from said switching equipment, said switching equipment including means operated in response to said line equipment to search for a preselected one of said subscriber stations and extend circuit connections to said substation, circuit extension means operated in response to said preselected substation to extend circuit connections to a second one of said substations and further including mode detecting means operated in response to the mode of operation marking of one of said substations to send signals received from said station in accordance with said mode; signal regenerating means; voice frequency repeating means; data detection means connected to said switching equipment operated in response to receipt of binary data signals to send said signals from said switching equipment to said data regenerating means and operated in response to receipt of voice signals to send said voice signals to said voice signal repeating means; said signal regenerating means operated in response to receipt of binary data signals to regenerate like signals and transmit said regenerated signals, including local signal generating means, signal comparison means and signal transmission means, said signal generating means adapted for regenerating signals in accordance with said first binary data mode of operation and second means adapted for regenerating signals in accordance with said second mode of binary data operation, said voice frequency repeating means operated in response to voice signals received from said switching means to repeat said voice signals and transmit said voice signals through said switching means to one of said subscriber stations and including first amplification means and second amplification means, signal rectification means and level determining means operated in response to rectified signals received from said first amplification means to control said second amplification means to increase or decrease the magnitude of signals transmitted from said voice frequency repeating means; a binary data mode determining means operated in response to said switching equipment to connect said switching equipment to one of said data regenerating means in accordance with said detected binary data mode.

References Cited in the file of this patent

UNITED STATES PATENTS

| | | |
|---|---|---|
| 2,684,996 | Potts | July 27, 1954 |
| 2,828,362 | Darwin et al. | Mar. 25, 1958 |
| 2,881,251 | Strip | Apr. 7, 1959 |